US011230364B2

(12) United States Patent
Custance

(10) Patent No.: US 11,230,364 B2
(45) Date of Patent: Jan. 25, 2022

(54) SLAT FOR AN AIRCRAFT WING

(71) Applicant: AIRBUS OPERATIONS LIMITED, Bristol (GB)

(72) Inventor: Denys Custance, Bristol (GB)

(73) Assignee: Airbus Operations Limited, Bristol (GB)

( * ) Notice: Subject to any disclaimer, the term of this patent is extended or adjusted under 35 U.S.C. 154(b) by 0 days.

(21) Appl. No.: 16/807,203

(22) Filed: Mar. 3, 2020

(65) Prior Publication Data

US 2020/0290724 A1    Sep. 17, 2020

(30) Foreign Application Priority Data

Mar. 12, 2019    (GB) ...................... 1903371

(51) Int. Cl.
*B64C 9/26* (2006.01)
*B64C 13/28* (2006.01)

(52) U.S. Cl.
CPC ............... *B64C 9/26* (2013.01); *B64C 13/28* (2013.01)

(58) Field of Classification Search
CPC .................................. B64C 9/26; B64C 13/28
See application file for complete search history.

(56) References Cited

U.S. PATENT DOCUMENTS

| 3,941,334 A | 3/1976 | Cole |
| 4,189,121 A | 2/1980 | Harper et al. |
| 5,161,757 A * | 11/1992 | Large .................. B64C 9/16 244/213 |
| 9,359,063 B2 | 6/2016 | Pisacreta |
| 2009/0134281 A1 | 5/2009 | Engelbrecht et al. |
| 2018/0141637 A1 | 5/2018 | Schlipf et al. |
| 2018/0162517 A1 | 6/2018 | Brown |

FOREIGN PATENT DOCUMENTS

| DE | 3700083 | 7/1987 |
| EP | 2590857 | 5/2013 |
| RU | 2 557 638 | 7/2015 |
| WO | 03/013956 | 2/2003 |
| WO | 2012/004594 | 1/2012 |
| WO | 2018/005534 | 1/2018 |

OTHER PUBLICATIONS

European Search Report cited in EP 20157456.3 dated Jul. 30, 2020, 8 pages.
Combined Search and Examination Report for GB Application No. 1903371.1 dated Sep. 2, 2019, 5 pages.

* cited by examiner

*Primary Examiner* — Justin M Benedik
(74) *Attorney, Agent, or Firm* — Nixon & Vanderhye P.C.

(57) ABSTRACT

A slat (108) for the leading edge of a swept aircraft wing includes slat tracks (114) that dictate the path of movement of the slat as it moves from a retracted position (FIG. 7) to a fully deployed position (FIG. 15). Each slat track (114) has a shape that follows a helical path. The motion of the slat thus includes a component of rotation about a first axis, which may be perpendicular to the line of flight (120) and a component of translational movement parallel to the first axis. When viewed from above the slat may move predominantly in a direction parallel to the line of flight (120).

20 Claims, 6 Drawing Sheets

SLAT FOR AN AIRCRAFT WING

RELATED APPLICATION

This application claims priority to United Kingdom patent application 1903371.1, filed on Mar. 12, 2019, the entirety of which is incorporated by reference.

BACKGROUND OF THE INVENTION

The present disclosure relates to a slat for the leading edge of an aircraft wing. More particularly, but not exclusively, this invention concerns a slat for a swept aircraft wing and a swept aircraft wing including such a slat. The invention also concerns a method of deploying or retracting a slat on a swept aircraft wing.

A leading edge slat on a swept wing of an aircraft is typically mounted for movement that, when viewed from above, is in a direction perpendicular to the leading edge. This is the conventional manner of deploying and retracting a slat on an aircraft wing, but with a swept wing with any significant angle of sweep this convention can introduce certain disadvantages and/or extra complications. Some of these are described below with reference to FIGS. 2 to 5 of the drawings attached hereto.

The present invention seeks to mitigate one or more of the problems associated with slats on swept aircraft wings that deploy and retract predominantly in a direction which is perpendicular to the leading edge of the slat. Alternatively or additionally, the present invention seeks to provide an alternative and/or improved slat for the leading edge of an aircraft wing and/or a wing including such a slat.

SUMMARY OF THE INVENTION

According to a first aspect there is provided a slat for the leading edge of an aircraft wing. The slat includes two or more slat tracks that in use dictate the path of movement of the slat as it moves from a retracted position to a fully deployed position. Each slat track has a shape that follows a helical path. As a result the slat may be configured, in an embodiment of the invention, so that when it moves it follows a curved path which when viewed from above moves predominantly in the line-of-flight direction, in preference to arrangements in the prior art where the path when viewed from above would be predominantly in a direction that is perpendicular to the leading edge of the slat. As such, the shape of the slat, and the shape of surrounding structure, can have lateral surfaces that are generally aligned with the line of flight (better from an aerodynamic and noise-reduction perspective), despite the wing and the slat having a swept leading edge (thus being angled when viewed from above to the perpendicular to the line of flight).

It may be that the slat may be configured, in other embodiments of the invention, so that when it moves it follows a curved path which when viewed from above moves predominantly in a direction which is at an acute angle, for example of more than 5 degrees (and optionally more than 10 degrees), to the perpendicular to the leading edge of the slat (for example, also at an acute angle, for example of more than 2 degrees, optionally more than 5 degrees, and possibly more than 10 degrees) to the line of flight. The direction of movement (when viewed from above) of the slat may be determined (i.e. by design) by altering the orientation of the axis of the helix defining the helical motion and/or the pitch of the helix.

It may be that the helical path followed by each slat track is substantially identical in shape. In such a case, the path travelled by the slat may be one that generally follows a helical path having a constant pitch and constant radius. It may be that the helical path of the shape of each slat track has the same pitch and/or same radius. It may be that the general shape of one slat track is helical having first radius of curvature and the general shape of another slat track is helical having a second, different, radius of curvature. Where there are more than two slat tracks, it may be that successive slat tracks in the spanwise direction have progressively smaller radii of curvature for example. The slat may move in a conical like fashion in such cases.

The length of at least one of the slat tracks, as between the start and the end of the helical path of the slat track corresponds to rotation about a helix axis of at least 15, possibly more than 20 degrees and/or less than 60 degrees, optionally less than 50 degrees and possibly 40 degrees or less.

The slat may include an aerofoil surface supported by the two or more slat tracks. The aerofoil surface may be substantially rigidly supported by at least one, and optionally all, of the two or more slat tracks. There may be provision, despite such a substantially rigid structure, to allow for flexure or bending caused by loading during use, such as for example wing flexure. It will be understood however that it is preferred for the slat tracks and aerofoil surface to be connected (or integrally formed) in a way that does not include complicated articulation or spherical joints or the like, which might otherwise be required if the slat were to follow complicated movements along an irregular path during its movement.

The slat may be so configured that each slat track has at least two external surfaces which are on opposite sides of the slat track when viewed in cross-section. The two external surfaces may be ruled surfaces. The two external surfaces may be defined by the two surfaces swept out by two notional fixed shape lines when moved along a helical path, for example when moved along such a path relative to the aerofoil surface of the slat. The slat may be so configured that each slat track has two further external surfaces which are on opposite sides of the slat track when viewed in cross-section, those two external surfaces being defined by the two surfaces swept out by two further notional fixed shape lines when moved along the helical path relative to the aerofoil surface of the slat. There may thus be four such surfaces, which when viewed in cross-section, define first and second opposing surfaces which can be viewed as left and right surfaces and third and fourth opposing surfaces which can be viewed as top and bottom surfaces.

Each slat track may have a cross-sectional shape that is substantially the same for the majority of the length of the slat track. The shape of the slat track may have a 3-dimensional shape that appears to twists in space.

The slat may have more than two slat tracks, and may for example have at least four slat tracks. Each of the additional slat tracks may have the features of the two or more slat tracks of the invention as described or claimed herein.

The provision of a slat according to of the invention as described or claimed herein may have particular benefit when installed on a swept aircraft wing, for example a wing having a sweep of between 20 and 30 degrees (as judged by the sweep of the leading edge of the wing in the region of the slat). The present invention thus further provides a wing, preferably a wing with a swept leading edge and a trailing edge, the wing leading edge including a slat according to the invention as described or claimed herein and/or having a slat on the leading edge arranged to travel along a helical path. The slat may include two or more slat tracks. It may be the slat tracks which in use dictate the path of movement of the slat. Each slat track may for example have a shape that follows a helical path.

The axis of the helix and the pitch of the helix (the helix which defines the shape of each slat track or the shape of the helix, which in certain embodiments, defines the main type of movement of the slat when being deployed or retracted) may be configured such that the lateral edges of the slat move substantially parallel to a vertical plane (for example when the wing is arranged in a direction corresponding to level flight with the wing on the opposite side of the aircraft being arranged symmetrically about a vertical plane) that is aligned with the line of flight of the wing. It may be that the axis of the helix is generally aligned with the leading edge of the slat. For example it may be substantially parallel to the leading edge, for example within +/−5 degrees. It may be that the axis of the helix is at an acute angle of more than 10 degrees to the horizontal axis which is perpendicular to the line of flight of the wing.

The pitch angle of the helix may be substantially the same as the local sweep angle of the leading edge of the wing.

It may be that the movement of each slat track is guided by one or more guide members, for example rollers. There may be multiple rollers for each slat track. For example there may be two sets of rollers. One set may be spaced apart from the other in a direction along the length of the slat track. The rollers may be arranged to constrain the movement of the track in two non-parallel directions (for example two directions which are transverse to each other—optionally orthogonal directions), each being perpendicular to the direction of motion of the slat track through the rollers. At least one roller axis may be oriented to be substantially perpendicular to the line of flight. The axes of all the rollers may be oriented to be substantially perpendicular to the line of flight. It may be that the axis of one of, and optionally each of, the rollers is parallel to a direction having zero curvature on the slat track surface. The track may have an external surface which is a ruled surface—i.e. it can be formed by sweeping a straight line (a notional line) along a profile. At least one of the rollers may roll on this (notional) line, thus maintaining a fixed line of contact between the roller external surface and the external surface of the slat track.

There may be at least two rollers which have axes which are substantially horizontal, when the aircraft is in level flight. The aircraft wing may include one or more pairs of track ribs, preferably at least two pairs. The ribs of each pair may be positioned either side of a slat track. It may be that at least one of the guide members/rollers is supported between a pair of such track ribs. Each track rib when viewed in plan may extend in a direction aligned with the line of flight.

In use, there may be a structure of some sort, presenting a surface which may for example be fixed relative to the wing or fuselage of the aircraft, the structure being adjacent to a lateral surface of the slat (and in very close proximity for example—e.g. the surface presented by the structure and the lateral surface may be directly adjacent to each other). In such a case, the path of movement of the slat as it moves from a retracted position to a deployed position may be such that the minimum separation between the surface presented by the structure and the lateral surface is constant (and preferably relatively small, i.e. small enough to allow for contact through an edge seal to provide aerodynamic sealing, for example less than 50 mm).

The present invention also provides an aircraft including a swept aircraft wing according to the invention as described or claimed herein.

The present invention yet further provides a method of deploying or retracting a slat on a swept aircraft wing. The method may utilise a swept aircraft wing according to the invention as described or claimed herein. The motion of the slat during movement between a fully deployed position and a fully retracted position may include a component of rotation about a first axis. The first axis may be fixed in space relative to the wing. The first axis may be spaced apart from the notional envelope relative to the wing within which the slat moves during the movement. The motion of the slat may include a component of translational movement, for example being substantially parallel to the first axis. The component of speed corresponding to the translational movement may be proportional to the component of speed of rotation corresponding to the rotation about the first axis. The motion of the slat may include a component of twisting motion about a second axis. It may be that the motion of the slat can be described as consisting of only the rotation about the first axis and a component of translational movement parallel to the first axis.

The aircraft may be a passenger aircraft, for example a commercial passenger aircraft configured to carry more than 50 passengers, for example more than 100 passengers. The aircraft may be an aircraft with a maximum take-off weight of at least 20 tonnes, possibly more than 40 tonnes.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
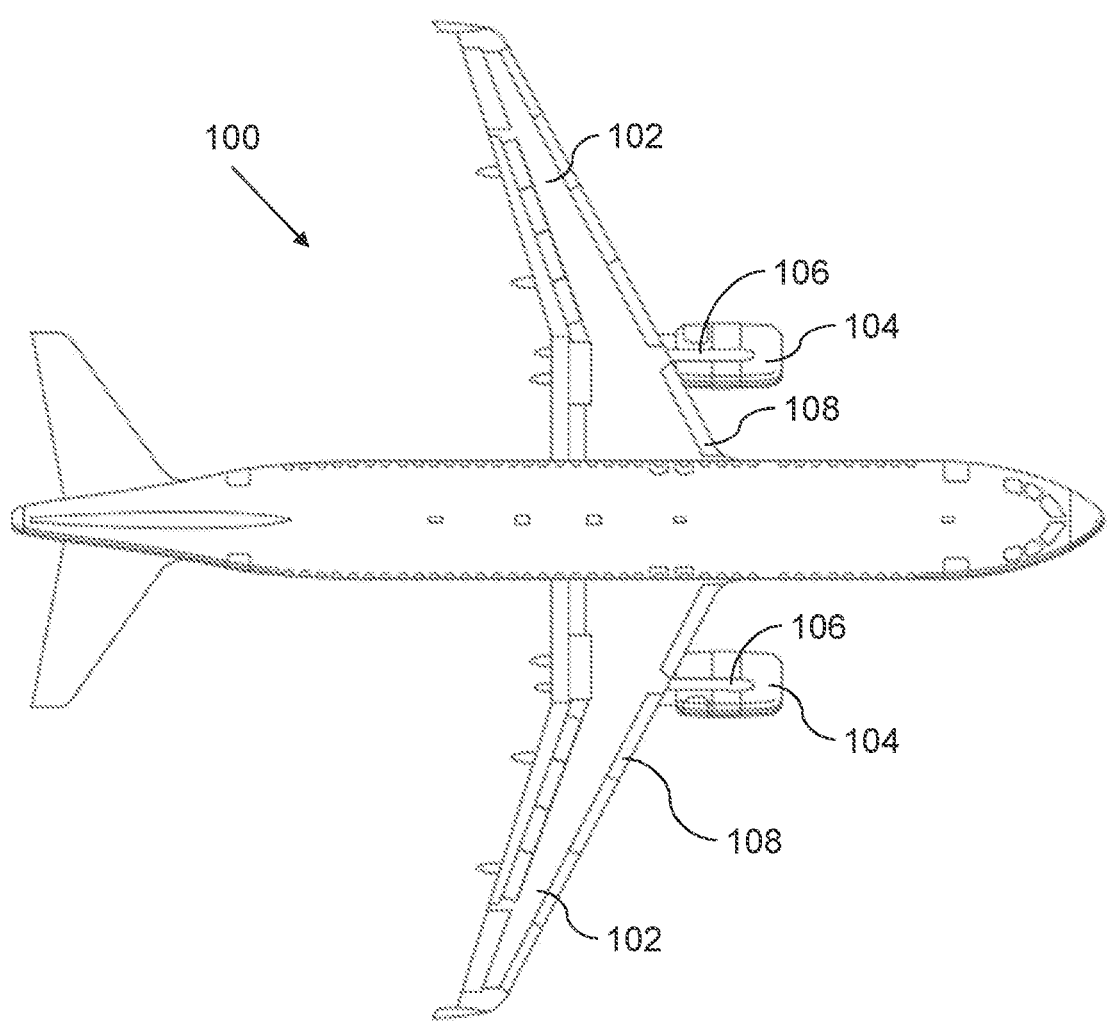
FIG. 1 shows an aircraft in plan view.
Figure 2:
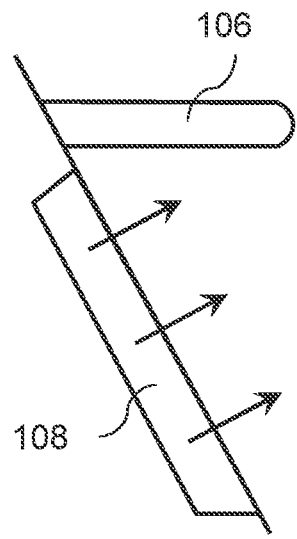
FIGS. 2 to 5 illustrate schematically arrangements which can be compared and contrasted with the embodiments.
Figure 3:
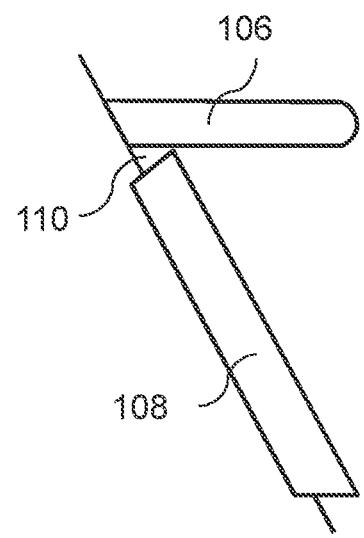
Figure 4:
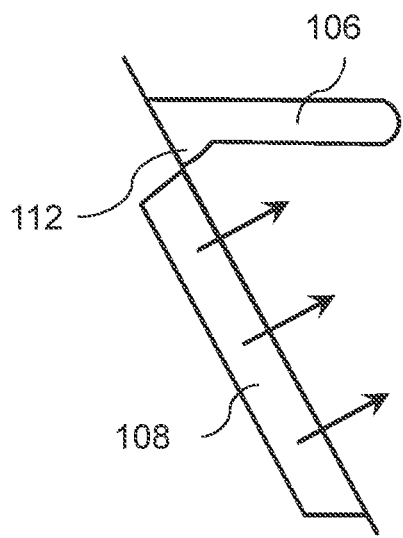
Figure 5:
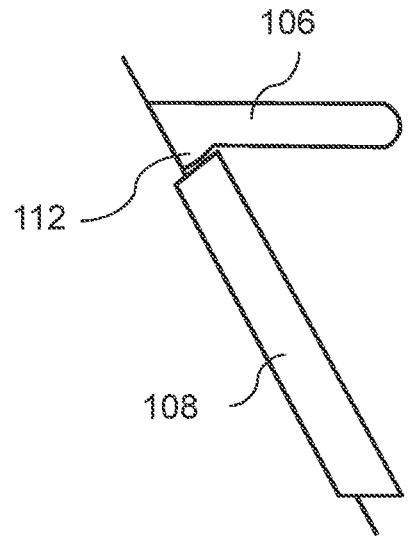

FIG. 1 shows schematically an aircraft 100 according to a first embodiment of the invention. The aircraft has two swept wings 102, the sweep angle being about 27 degrees. Each wing 102 carries an engine 104 which is supported via an engine pylon 106. The wing includes various slats 108 on the leading edge of the wing. (The shape and arrangement of the slats shown in FIG. 1 are shown schematically.) FIGS. 2 to 5 show in highly schematic format a close up of slat arrangements that are not in accordance with the present invention. FIGS. 2 and 3 represent an arrangement on a swept wing with a slat 108 that moves from its stowed position (FIG. 2) to its deployed position (FIG. 3) in a direction that is perpendicular to the leading edge, in the conventional manner. Without any special measures being taken a gap 110 is present between a lateral edge of the slat when deployed and the edge of the pylon. FIGS. 4 and 5 represent an arrangement in which the pylon 106 has a bulge 112 incorporated to mitigate against the effects that would otherwise be introduced by the present of a gap (i.e. a gap 110 of the sort shown in FIG. 3), with FIG. 4 showing the slat 108 in its stowed position and FIG. 5) showing the slat 108 in a deployed position. Other solutions for filling the gap include adding extra moving parts to fill the gap when the slat is deployed.

Figure 6:
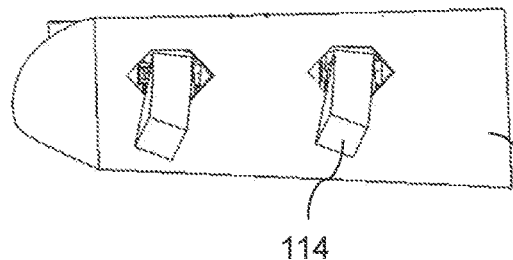
FIGS. 6 to 17 show a slat according to a first embodiment as it moves from a retracted position to a deployed position, as viewed at various stages and at various angles of viewing.
Figure 7:
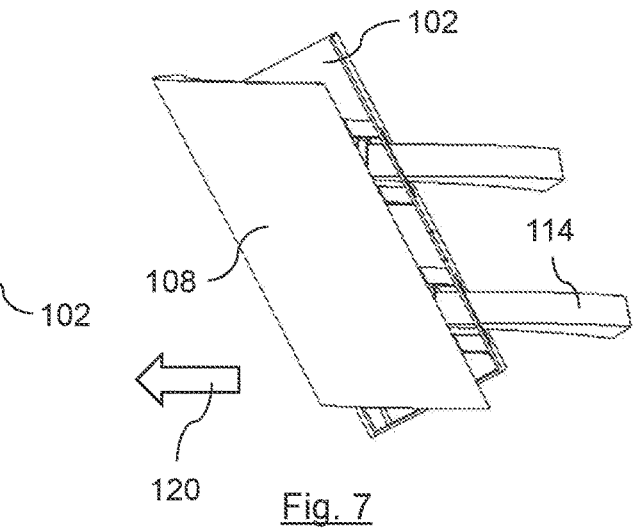
Figure 8:
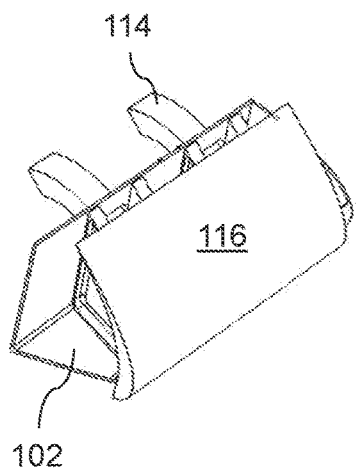
Figure 9:
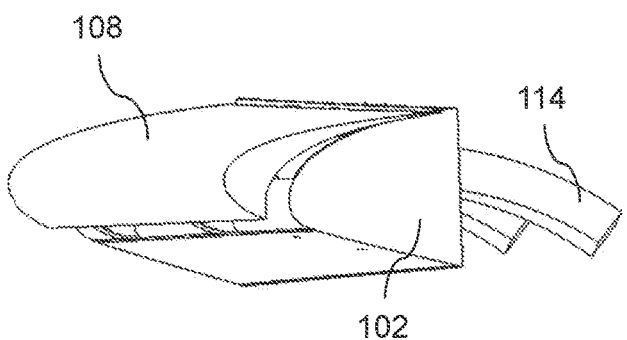
Figure 10:
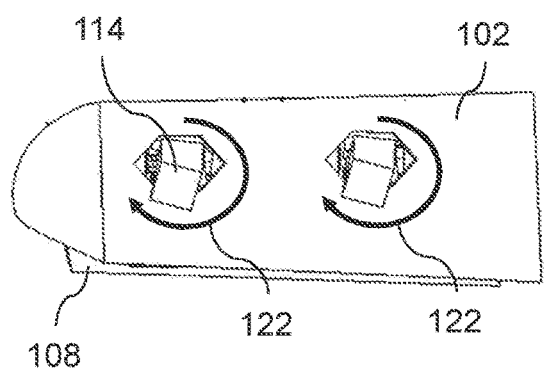
Figure 11:
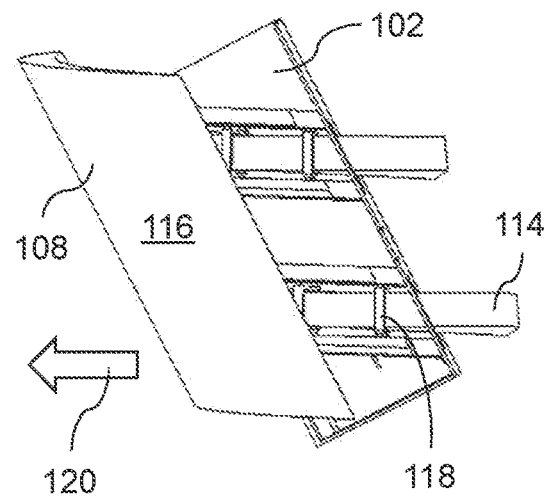
Figure 12:
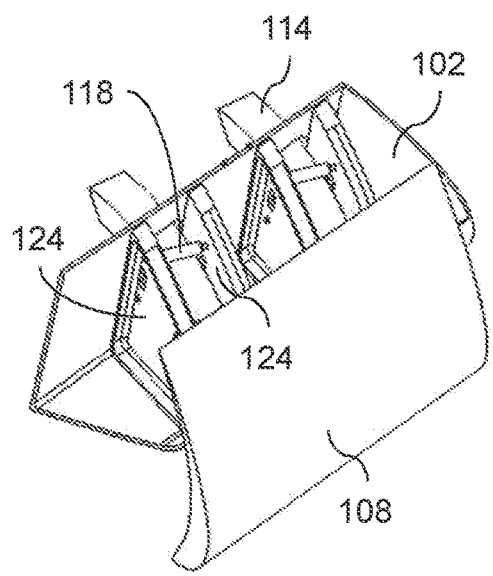
Figure 13:
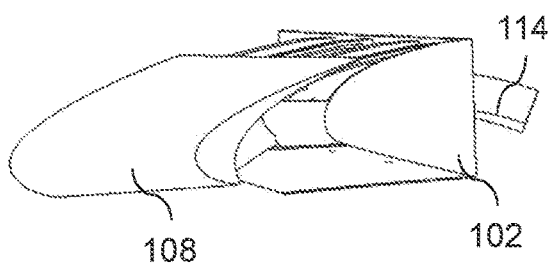
Figure 14:
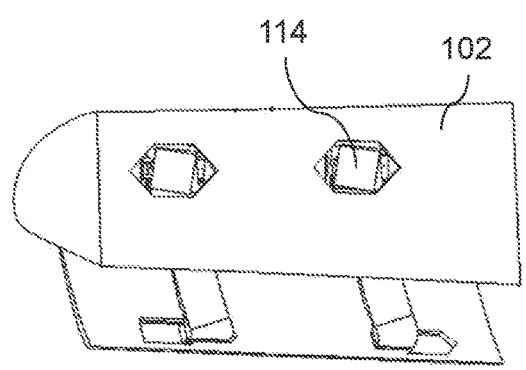
Figure 15:
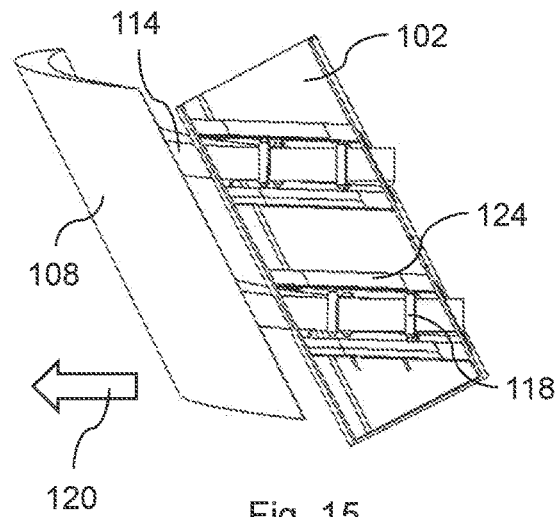
Figure 16:
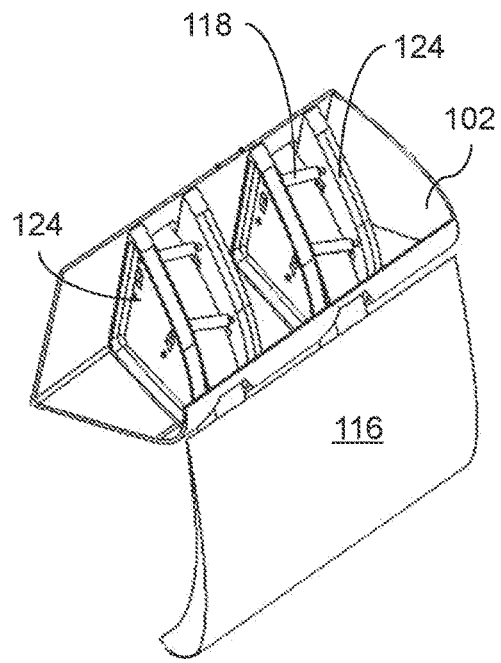
Figure 17:
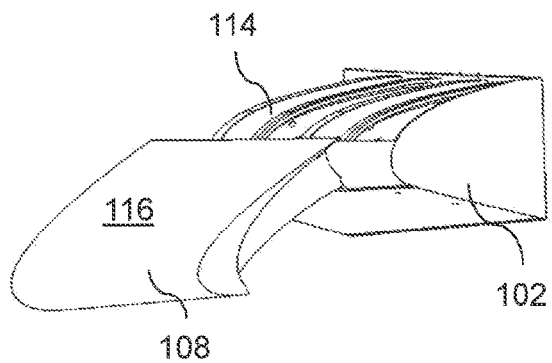

FIGS. 6 to 17 show a slat 108 and part of the aircraft wing 102 of the first embodiment in various perspective views. FIGS. 6 to 9 show the slat in its fully stowed position (viewing from various angles), FIGS. 10 to 13 show the slat in a partially deployed position (viewing from the same set of various angles) and FIGS. 14 to 17 show the slat in a fully deployed position (again, viewing from the same set of various angles). FIGS. 6, 10, and 14 show the slat from behind (i.e. looking in the direction of the line of flight). FIGS. 7, 11, and 15 are views from above. FIGS. 8, 12, and 16 are views from one side and above, whereas FIGS. 9, 13, and 17 are views from the other side and below. The slat is shown as including two slat tracks 114 having a generally square-shaped cross-section (although in reality the cross-sectional shape may be more complicated in cross-section—for example being having a cross-sectional shape that is similar to shapes currently used in slat tracks of the prior art). Each slat track has a shape which follows a helical path along its length. In this example the shape can be described as that defined by a constant cross-section (shown as a square in the drawings) following a helical path in space. The shape of the slat track appears to twist in space (compare FIGS. 6, 10 and 14 for example). The helix defined by the path defined by the centre point of each slat track has the same, constant radius, and the same constant pitch.

The slat tracks 114 are substantially rigidly attached (whilst allowing for some flexure—see below) to the structure that supports the aerofoil surface 116 of the slat 108. The slat tracks are each arranged to pass through fixed axis rollers 118 as the slat moves between its stowed and deployed positions. The rollers are arranged between parallel-arranged slat track ribs 124, which extend in a direction substantially aligned with the line of flight. There are two sets of rollers per slat track, each set having four rollers, one for each side of the cross-sectional shape of the slat track. Thus, there is a set path of travel of the slat tracks as they move through the rollers. The set path is, as a result of the geometry of the helically shaped slat tracks, a helix. The helix has a constant pitch, a constant radius and a helix axis which is fixed in space relative to the wing when the slat moves from one position to another. The slat revolves about the axis of the helix by about 30 degrees between its fully stowed position and its fully deployed position. It will be appreciated that the radius of the helix is therefore relatively large compared to the distance moved by the slat between its fully stowed position and its fully deployed position and lies at a position significantly below and spaced apart from the leading edge of the wing. The slat and slat tracks do not at any point intersect the axis of the helix during their movement.

The movement of the slat through space as it moves from its fully stowed position to its fully deployed position follows a helical path. The axis of the helix (defining the helical path taken) is substantially parallel to the leading edge of the slat, and has a radius and pitch such that the slat appears to move parallel to the line of flight of the wing, when viewed from above. As it moves, the leading edge of the slat stays approximately parallel with the leading edge of the region of the wing from which it extends. Discounting any flexure in components, the movement of the tracks through space are such that the position of the shape of a cross-section of a slat track at a given fixed distance from the rollers is maintained substantially exactly as the slat track moves through the rollers (in a manner conceptually similar to a shape of material caused by means of being extruded as it passes through an extrusion die with a twisted passageway).

Figure 18:
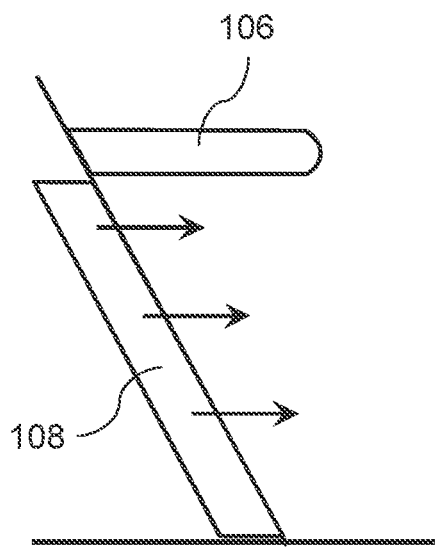
FIGS. 18 and 19 illustrate schematically the arrangement of the first embodiment in a manner similar to that shown in FIGS. 2 to 5, to aid comparison.
Figure 19:
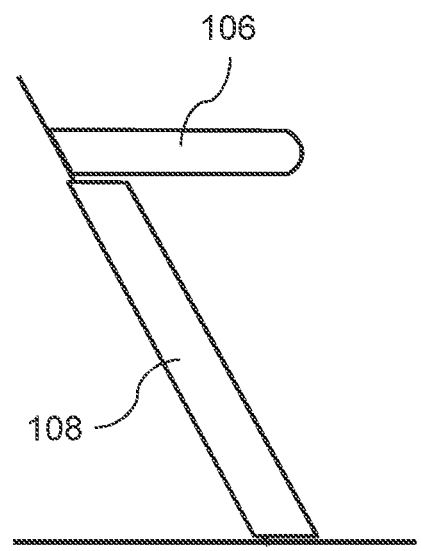

With reference to FIGS. 7, 11 and 15 it will be observed that the lateral edges of the slat move substantially parallel to the line of flight (indicated by the arrow 120) of the wing 102. FIG. 18 (plan view of slat when stowed) and FIG. 19 (plan view of slat when partially deployed) show schematically the benefit of such an arrangement. It will be see that the engine pylon 106 can have a conventional shape with edges aligned with the line of flight, the lateral edges of the slat 108 may be generally aligned with the line of flight, and the movement of the slat—being generally in the line of flight when observed from above—is also in the direction of the line of flight. Thus, no gaps are created when the slat is moved from one position to another which might otherwise need to be treated in some way (compare with FIGS. 2 to 5). The separation between the lateral edge of the slat and the corresponding lateral edge of the pylon, when viewed in plan, remains about the same during the movement of the slat between its fully stowed position and its fully deployed position. Also, the separation between the other lateral edge of the slat and the corresponding surface of the fuselage, when viewed in plan, remains about the same during the movement of the slat between its fully stowed position and its fully deployed position.

Figure 20:
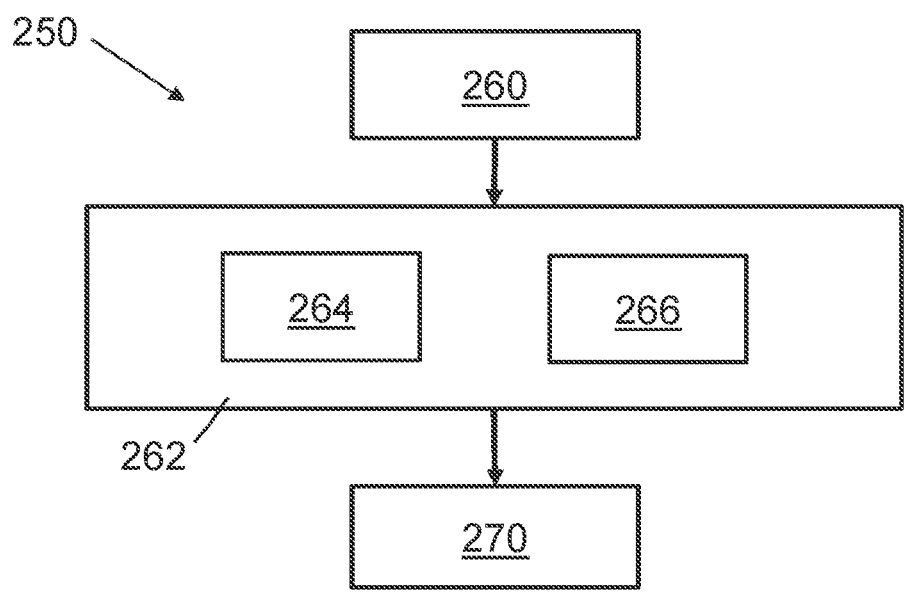
FIG. 20 is a schematic flow diagram illustrating the steps of a method in accordance with a second embodiment relating to moving a slat on a swept wing of an aircraft.

FIG. 20 is a schematic flow diagram 25 illustrating the steps of a method when moving a slat on a swept wing of an aircraft, in accordance with a second embodiment. At step 260, the slat is in its fully deployed position. Step 262 represents the movement of the slat from the deployed position to the retracted position. As part of this step the slat moves with only two principal components of motion represented by the two boxes 264 and 266 shown in FIG. 18. A first component (box 264) consists of rotation about a first axis and represents the major component of the motion of the slat. Thus, the movement of the slat may, as a first approximation, be described as movement in an arc with a centre of rotation about the first axis. The extent of the movement through this arc of the slat when the movement of the slat from the deployed position to the retracted position is less than 50 degrees about the first axis. The first axis is approximately level with the horizontal (within a margin of +/−20 degrees, say) and lies beneath and spaced apart from the wing. The first axis is also substantially parallel (when viewed from above) with the leading edge of the slat (within a margin of +/−5 degrees, say). There is a notional envelope, which may be considered as being fixed in position and shaped relative to the wing, within which the slat moves during the movement. The radius of curvature of the movement about the first axis is large enough that the first axis is spaced apart from the notional envelope within which the slat moves. A second component (box 266) consists of translational movement parallel to the first axis. The amount of movement of the second component is directly proportional to the amount of movement of the first component, so that the speed of translation movement of this second component is proportional to the speed of rotation about the first axis.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The slat may have three slat tracks, and possibly four, in alternative embodiments, and possibly more. One or more of the tracks may be driven, but there may be slave tracks that are not driven. At least some of the rollers may be resiliently mounted to offer some flexing of the tracks relative to each other, or to accommodate wing flexure, during loading.

The motion of the slat does not need to be such that all parts of the slat have the same main axis of (helical) rotation. Successive slat tracks may describe helical paths with successively greater radii (each helix concerned having a constant radius) in the spanwise direction. The slat track may describe a path which can be described as helical but which nevertheless is not exactly aligned with a mathematically perfect helix.

It will be appreciated that the angle through which the slat revolves, about the axis of the helix, between its fully stowed position and its fully deployed position will differ depending on aircraft requirements and could be as low as 15 degrees, or lower, and could be as high as 40 degrees, or higher.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The term 'or' shall be interpreted as 'and/or' unless the context requires otherwise.

The invention claimed is:

1. A slat for a leading edge of an aircraft wing, the slat including:
   at least two slat tracks that in use dictate a path of movement of the slat as the slat moves from a retracted positon to a fully deployed position, wherein each of the at least two slat tracks has a shape that follows a helical path, and
   an aerofoil surface fixed to the at least two slat tracks, wherein the aerofoil surface and the at least two slat tracks are configured to move along the helical path as the aerofoil surface and the at least two slat tracks deploy forward of the leading edge of the aircraft wing.

2. The slat according to claim 1, wherein:
   each slat track of the at least two slat tracks includes at least two external surfaces on opposite sides of the slat track when viewed in cross-section, and
   the two external surfaces of each of the slat tracks are defined by two surfaces swept out by two notional fixed shape lines when moved along the helical path relative to the aerofoil surface of the slat.

3. The slat according to claim 1, wherein each slat track has a cross-sectional shape which remains constant for a majority of a length of the slat track.

4. The slat according to claim 1, wherein the helical path corresponding to one of the slat tracks is a helix having a first radius and the helical path corresponding to another of the slat tracks is a helix having a second radius from the first radius.

5. The slat according to claim 2, wherein the aerofoil surface is rigidly supported by at least one of the two or more slat tracks.

6. The slat according to claim 2, wherein the slat forms part of a swept aircraft wing.

7. A swept aircraft wing including:
   a leading edge;
   a trailing edge;
   a slat configured to extend from the leading edge of the aircraft wing; and
   at least two slat tracks supporting the slat and each having a shape configured to move the slat and the at least two slat tracks along a helical path as the at least two slat tracks and the slat extend forward of the leading edge of the aircraft wing.

8. The swept aircraft wing according to claim 7, wherein each slat track of the two or more slat tracks has a shape that follows a helical path along at least a portion of the slat track extending forward of the leading edge of the aircraft wing.

9. The swept aircraft wing according to claim 8, wherein each slat track of the two or more slat tracks has a cross-sectional shape that remains constant for a majority of a length of the slat track.

10. The swept aircraft wing according to claim 8, wherein at least one of (a) the helical path along which the slat moves and (b) the helical path defining a shape of at least one of the slat tracks, is in a shape of a helix wherein an axis of the helix and a pitch of the helix are configured such that lateral edges of the slat move parallel to a vertical plane aligned with a line of flight of the wing.

11. The swept aircraft wing according to claim 8, wherein at least one of (a) the helical path along which the slat moves and (b) the helical path defining a shape of at least one of the slat tracks, is in a shape of a helix wherein an axis of the helix is aligned with a leading edge of the slat.

12. The swept aircraft wing according to claim 7, including two sets of rollers, wherein the two sets of rollers guide a movement of each slat track, and the two sets of rollers are spaced from each other in a direction along a length of the slat track, and each set of the two sets of rollers constrains movement of the track in two orthogonal directions perpendicular to a direction of motion of the slat track through the two set of rollers.

13. The swept aircraft wing according to claim 12, including at least two pairs of track ribs wherein:
   the ribs of each pair of the at least two pairs of track ribs are positioned on either side of a slat track,
   at least one roller of the two sets of rollers is supported between a pair of track ribs, and
   each track rib when viewed in plan extends in a direction aligned with the line of flight.

14. The swept aircraft wing according to claim 7, wherein there is a fixed surface of the swept aircraft wing which is adjacent a lateral surface of the slat, wherein a path of movement as the slat moves from a retracted positon to a deployed position is such that a minimum separation between the fixed surface and the lateral surface is constant.

15. The swept aircraft wing according to claim 14, wherein the fixed surface is part of an engine pylon or a part of an aircraft fuselage.

16. The swept aircraft wing according to claim 7, wherein the swept aircraft wing has a sweep in a range of 20 to 30 degrees.

17. An aircraft including the swept aircraft wing according to claim 7.

18. A method comprising:
  deploying or retracting a slat on a swept aircraft wing to move the slat between a fully deployed position and a fully retracted position, wherein the slat includes an aerofoil surface supported by at least two slat tracks which dictate a path of movement;
  wherein a movement of the slat from the fully retracted position to the fully deployed position includes:
    extending of both the aerofoil surface and the at least two slat tracks forward of a leading edge of the swept aircraft wing along the path of movement;
    rotation of the aerofoil surface and the at least two slat tracks about a first axis fixed in space relative to the swept aircraft wing and spaced from a notional envelope relative to the swept aircraft wing within which the slat moves during the movement, and translational movement parallel to the first axis, wherein a speed of the translation is proportional to a speed of the rotation about the first axis.

19. The method according to claim 18, wherein:
  the swept aircraft wing has a sweep in a range of 20 to 30 degrees,
  the movement of each of the at least two slat tracks is guided by rollers fixed to the swept aircraft wing,
  the slat tracks have a shape which causes the slat to move with the speed of the component of translational movement being proportional to the speed of rotation about the first axis.

20. A slat for a leading edge of an aircraft wing, the slat including:
  an aerofoil surface positioned forward of a leading edge of the aircraft wing;
  at least two slat tracks supporting the aerofoil surface and extending into the aircraft wing,
  wherein each slat track of the at least two slat tracks is configured to extend forward of the leading edge of the aircraft wing,
  wherein each slat track of the at least two slat tracks has a helical shape along a length of the slat track.

* * * * *